US007185342B1

(12) United States Patent
Carrer et al.

(10) Patent No.: US 7,185,342 B1
(45) Date of Patent: Feb. 27, 2007

(54) DISTRIBUTED SERVICE AGGREGATION AND COMPOSITION

(75) Inventors: Marco Carrer, Wakefield, MA (US); Alok Z. Srivastava, Chelmsford, MA (US); Paul Lin, Nashua, NH (US); Wai-Kwong Lee, Nashua, NH (US); Cheng Han, Lexington, MA (US); Kan Deng, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1285 days.

(21) Appl. No.: 09/912,458

(22) Filed: Jul. 24, 2001

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/313; 709/119
(58) Field of Classification Search .......... 719/31–320, 719/328–330; 709/219, 223
See application file for complete search history.

(56) References Cited

U.S. PATENT DOCUMENTS

| | | | | |
|---|---|---|---|---|
| 5,671,225 | A * | 9/1997 | Hooper et al. | 370/468 |
| 6,542,912 | B2 * | 4/2003 | Meltzer et al. | 715/501.1 |
| 6,986,145 | B2 * | 1/2006 | Gangopadhyay | 719/316 |
| 2002/0095399 | A1 * | 7/2002 | Devine et al. | 707/1 |
| 2002/0120685 | A1 * | 8/2002 | Srivastava et al. | 709/203 |
| 2003/0005090 | A1 * | 1/2003 | Sullivan et al. | 709/220 |
| 2004/0205613 | A1 * | 10/2004 | Li et al. | 715/523 |

OTHER PUBLICATIONS

W3C, XSL Transformations, Version 1, Nov. 16, 1999, pp. 1-6.*
Grau, Analysing object specifications for Execution, 1998.*
Casati et al, Adaptive and Dynamic Service Composition in eFlow, Caise 2000, LNCS 1789, pp. 13-31, 2000.*
Robert Orfali, et al., "The Essential Distributed Objects Survival Guide", 1996, Ch. 21, 24, 26, 29.
Don Box, et al., "Simple Object Access Protocol (SOAP) 1.1", W3C Note May 8, 2000, http://www.w3.org/TR/SOAP/, downloaded Oct. 30, 2001, 35 pages.
Erik Christensen, et al., "Web Services Description Language (WSDL) 1.1", W3C Note Mar. 15, 2001, http://www.w3.org/TR/wsdl, downloaded Oct. 30, 2001, 52 pages.
Heather Kreger, "Web Services Conceptual Architecture (WSCA 1.0)", IBM, May 2001. pp. 1-40.
Toufic Boubez, et al., "UDDI Data Structure Reference V1.0", UDDI Open Draft Specification Sep. 30, 2000, Uddi.org, Sep. 30, 2000, pp. 1-32.
David Ehnebuske, et al., "UDDI Data Structure Reference V2.0", UDDI Open Draft Specification Jun. 8, 2001, Uddi.org, Jun. 8, 2001, pp. 1-37.

* cited by examiner

*Primary Examiner*—William Thomson
*Assistant Examiner*—Diem Cao
(74) *Attorney, Agent, or Firm*—Hickman Palermo Truong & Becker LLP; John D. Henkhaus (57) ABSTRACT

Techniques are provided for defining and coordinating execution of a compound service, which uses results from a plurality of base services, over a network. A sequence in which a plurality of modules must be executed to perform the compound service is specified in dependency information, and the modules in the sequence are executed according to the dependency information and under the management of a service execution adapter. Each module operates upon messages according to module properties, and is able to communicate using event messages.

35 Claims, 4 Drawing Sheets

DISTRIBUTED SERVICE AGGREGATION AND COMPOSITION

FIELD OF THE INVENTION

The present invention relates generally to distributed services and, more specifically, to techniques for coordinating execution over a network of a service that uses output from a plurality of services.

BACKGROUND OF THE INVENTION

One definition of a Web service is any information source conveniently packaged for use by an application or end-user. Web services are increasingly becoming the means through which one can provide functionality over a network. Currently, activities focusing on defining and standardizing the use of Web services include the development of Web Services Description Language (WSDL). WSDL is an Extensible Markup Language (XML) format for describing network, or Web, services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services).

With respect to creating, distributing, and managing distributed program objects in a network, the Common Object Request Broker Architecture (CORBA) allows programs at different locations and developed by different vendors to communicate over a network through an "interface broker." A critical component of this architecture is an Object Request Broker (ORB), which acts as the broker between a client request for a service from a distributed object or component and the completion of that request. Typically, ORB-based strategies are designed and utilized to transform the results of one proprietary, transaction-oriented application for consumption by another application.

In such a highly distributed computing model such as that of Web services, implementation of a CORBA architecture does not provide a technique for defining and composing compound Web services consisting of an aggregation of multiple existing Web services. Furthermore, neither does the WSDL describe how a solution to this previously unmet need can be accomplished. Hence, there is a need for a technique for composing and executing compound Web services consisting of an aggregation of multiple existing Web services.

SUMMARY OF THE INVENTION

A technique is provided for defining and coordinating execution of a compound service, which uses results from a plurality of base services, over a network. The base services used by a compound service may themselves be compound services. A sequence in which a plurality of modules must be executed to perform the compound service is specified in dependency information. In one embodiment, the dependency information specifies the sequence as a directed graph, and may include portions in which two or more threads of operations may be performed in parallel.

When a compound service is to be executed, the dependency information for that compound service is inspected, and the modules required to perform the compound service are executed in the sequence specified in the dependency information. Each module is able to communicate using event messages and operates upon messages according to module properties.

According to one aspect of the invention, available modules include a transformation module for transforming message information from one data structure to another data structure, a splitter module for dividing a message into a plurality of messages, a merger module for merging a plurality of messages into a single message, and a service execution module for coordinating execution of a base service. According to another aspect of the invention, the event messages contain an array of Extensible Markup Language (XML) messages and the transformation, splitter, and merger modules operate at least partially by applying information in an Extensible Stylesheet Language Transformation (XSLT) stylesheet.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system for aggregation and composition of network services is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Preamble

"Dynamic service," "Web service," "network service," "distributed network service," "base service," "electronic service," and just "service" are all examples of terms used to describe a function that is available to users that are communicatively connected to the function over a network, and which are executable on one or more processors to provide a service result. The terms used primarily throughout this description are "base service" and "service." "Compound service" is used to describe a service that uses results from the execution of one or more base services.

Companies may wish to focus on their core businesses and, consequently, leverage third party functionality to offer added-value services related to their core businesses. Using third party services to build compound services offers developers a faster time-to-market for compound services, as well as flexible delivery and deployment. Furthermore, companies may wish to integrate their added-value services into business-to-business (B2B) exchanges and other Web applications.

Hence, a previously unmet need exists for a simple and flexible technique to aggregate multiple Web services into a compound service, and to manage the execution of the compound service, thus leveraging existing services available on the World Wide Web.

Service Aggregation and Composition

Figure 1:
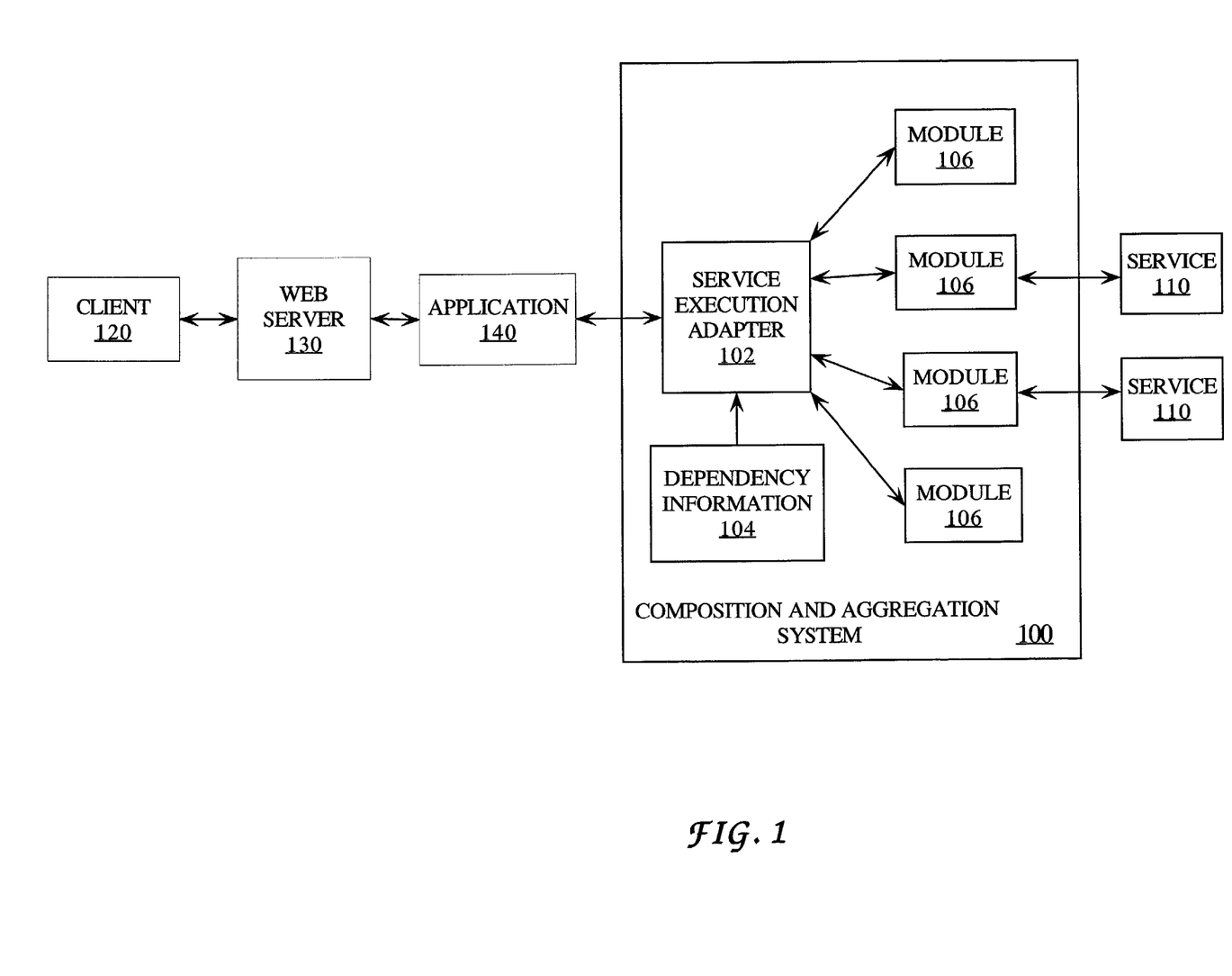
FIG. 1 is a block diagram generally illustrating an exemplary service composition and aggregation system according to an aspect of the invention, and related interfaces.

FIG. 1 is a block diagram generally illustrating an exemplary distributed network service composition and aggregation system 100 (hereinafter referred to as "the system"), according to an embodiment of the invention, and related interfaces. The system 100 includes a service execution adapter 102 communicatively coupled to dependency information 104 and a plurality of invokable modules 106.

The techniques described herein provide for composition of a compound service through aggregation of constituent base services, and provide a method of managing the execution of the compound service. The service execution adapter 102 coordinates the execution of the modules 106 according to dependency information 104. The dependency information 104 for a compound service specifies a sequence in which various invokable modules 106 must execute to perform the compound service. Generally, dependency information 104 describes the relation or association that module input and output data have to other module(s) within the same execution sequence. More specifically, according to one embodiment, dependency information 104 specifies, for each module 106 utilized to execute a compound service, (1) from which module 106 input data is required and (2) to which module 106 output data should be sent.

Figure 2:
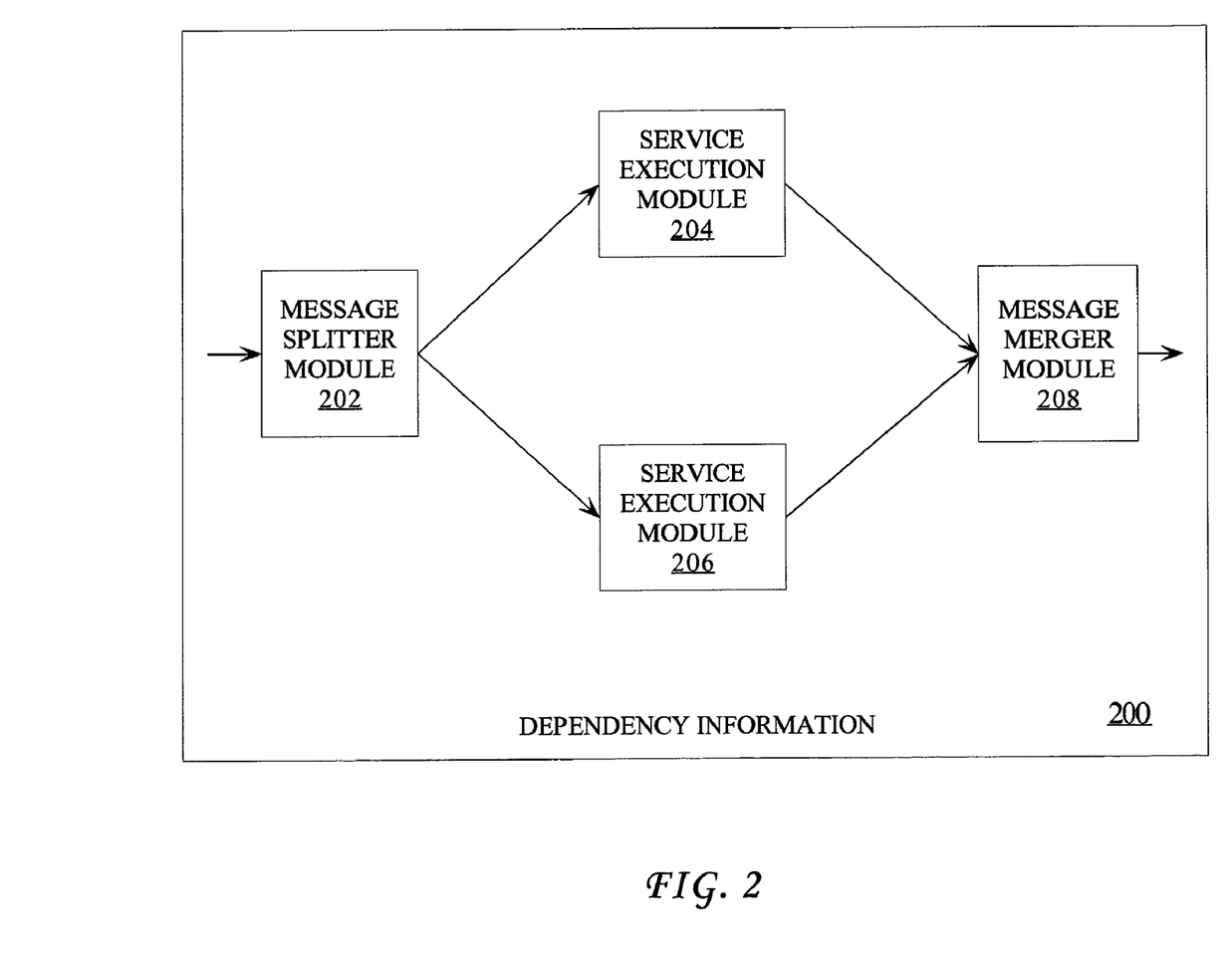
FIG. 2 is a block diagram generally illustrating exemplary dependency information, according to an embodiment of the invention.

In one embodiment, the dependency information 104 is represented as a directed graph, as exemplified and described in detail in reference to FIG. 2. A directed graph provides means for generating and visually conceptualizing the sequential flow of service executions and related transformations that define a compound service execution. Each node of the graph is identified as a module 106, which is described in detail below. In one embodiment, the system 100 operates to transform a directed graph representation into a matrix representation of the module execution sequence information.

According to one embodiment, modules 106 are capable of exposing their properties and communicating through use of events. Use of module 106 properties allows developers to customize modules for specific services or for other purposes. An exemplary implementation of the system 100 utilizes Java Beans, which are reusable software components developed with the JavaBeans™ component model, for module 106 construction and implementation. The module 106 properties are defined and set at compound service design time, and persist through compound service runtime when they are utilized to control the service executions. Module 106 processing is triggered by an event. In one embodiment, the event contains an array of Extensible Markup Language (XML) messages. After processing, the module 106 fires a new event containing the resulting data. Again, in the one embodiment, the response event contains an array of XML messages.

Use of XML is a flexible way to create common information formats and share both the structure of the data and the data. The XML language describes a class of data objects called XML documents and partially describes the behavior of computer programs which process them. In general, XML documents include tags that name fields and mark the beginnings and ends of fields, and include values for those fields. The XML format is described in detail at www.oasis-open.org/cover/xml.html and at the sites listed there.

Exemplary Module Types

Referring back to FIG. 1, an embodiment of the invention utilizes six types of modules 106, but practice of the invention is not intended to be limited to using these module types only nor is practice intended to require use of each module type. The module types are (1) service execution module, (2) message transformer module, (3) message splitter module, (4) message merger module, (5) conditional module, and (6) custom module. Each particular compound service is executed by executing modules 106 according to the sequence specified in the dependency information 104 that corresponds to the particular compound service.

Each service execution module executes, or manages the execution of, one base service. The base service that is associated with a service execution module is specified by setting a service execution module property, and execution of the base service is triggered by an event. In one embodiment, the event carries an array of XML messages. The service execution module interprets the event messages as a base service request and generates another event (a response event), e.g., an array of XML messages, representing the result returned from the executed base service. For example, a service execution module 106 may be specified to execute a stock portfolio service. In the example, the service triggering event passed from the service execution module 106 to the portfolio service includes a stock symbol, which is interpreted by the portfolio service as a request for the current stock price of the stock represented by the stock symbol. The portfolio service performs its function, i.e., obtaining the current stock price, and passes the stock price back to the same service execution module 106, whereby the stock price is formulated into a response event which is passed to the service execution adapter 102. Alternatively, the result from the base service may pass directly to the service execution adapter 102 where it is formulated into a response event, typically for passing on to the next module 106 in the execution sequence. Furthermore, in addition to managing the execution of a base service, a service execution module can also be configured to contribute to the management of a compound service such that compound services can be nested or embedded in another compound service.

The message transformer module is used to transform the data structure of its activation event message(s) to a different data structure. Thus, the syntax of an event message(s) is adaptable to fulfill a request for a specific data structure from another module 106 or service. In the embodiment using XML messages for the event, the transformation is enacted through application of one or more Extensible Stylesheet Language Transformation (XSLT) stylesheets specified as properties of the transformation module. As known in the art, XSLT is a standard technique for describing how to change the data structure of an XML document.

Returning to the stock portfolio service example, if the compound service was designed to output the service result as an XML document with different syntax than the input XML document (possibly to fulfill the requirement of another application), a message transformer module is used to perform the transformation. The stock price, having been formulated into an XML document representing the response event, is passed to a message transformer module. The message transformer module applies an XSLT stylesheet to modify the XML response event to follow a different document type definition (DTD) than that followed by the original XML response event. A DTD is a specification that accompanies a document and identifies the markups and how each is to be processed. The message transformer module can perform transformations other than that described, thus the invention is not limited to the exemplary transformation, nor is it limited to the embodiment utilizing XSLT stylesheets.

The message splitter module is used to divide a single input, or event, message into multiple output, or response, messages. The message splitter module can be used to feed the same request message to a plurality of service execution modules, after the message has been transformed into the proper requested data structure, if necessary. Again, in the embodiment using XML messages for module intercommunication, the input message is divided and converted (if necessary) through application of one or more XSLT stylesheets, which are specified as properties of the splitter module. Each specified XSLT stylesheet is applied to the input message and a representation of the result is appended to the array of messages representing the response event.

Returning to the stock portfolio service example, perhaps the compound service is designed to pass the stock price to both a currency conversion service and to a language conversion service so that an ultimate result can be presented to the requestor in a requested currency and language. The message splitter module is used to perform the split, whereby it applies an XSLT stylesheet to transform the XML response event into two XML documents following two different DTDs, one required by the currency conversion service and one required by the language conversion service. Hence, the input event is transformed into two output events with different data specifications for different applications. The message splitter module can perform transformations other than that described, thus the invention is not limited to the exemplary transformation, nor is it limited to the embodiment utilizing XSLT stylesheets.

The message merger module is used to merge multiple input messages into a single output message, thus allowing the results from a plurality of service executions to be represented in a single response event. Furthermore, in the embodiment using XML messages for module intercommunication, the input messages are merged and converted (if necessary) through application of one or more XSLT stylesheets, which are specified as properties of the merger module.

Returning again to the stock portfolio service example, once appropriate service execution modules execute the currency conversion and the language conversion services, the message merger module is used to merge both results into a single result in the requested currency and language. The message merger module applies an XSLT stylesheet to transform two XML response events following two different DTDs into one XML document following a single DTD. Hence, the two input events are transformed into a single response event representing the stock price in the requested currency and language. The message merger module can perform transformations other than that described, thus the invention is not limited to the exemplary transformation, nor is it limited to the embodiment utilizing XSLT stylesheets.

The conditional module is used to provide more than one module execution path, wherein the applicable path chosen from the more than one execution path is determined based on the status of one or more conditions. The response event of the conditional module provides instructions to the service execution adapter 102 as to which execution path, represented by dependency information 104, to employ to identify the subsequent modules 106 in the execution sequence. The content of the response event is dependent upon the status of a condition wherein the condition is defined in the conditional module properties.

Perhaps the requestor in our stock portfolio service example requests the stock price language conversion only if the price exceeds a predefined threshold. Thus, the conditional module is utilized to determine the status of the condition, that is, whether the stock price exceeds the predetermined threshold. If the price does not exceed the threshold, the conditional module directs the service execution module 102 to follow a module execution sequence, specified in the dependency information 104, that does not include the language conversion service. On the other hand, if the price threshold is exceeded, the conditional module directs the service execution module 102 to follow a module execution sequence, specified in the dependency information 104, that includes the language conversion service.

Finally, the custom module can be developed to provide some other logic to the service execution sequence. To enable the custom module to communicate with other modules, an interface is developed to handle the custom module properties and events.

System Operation

Returning to FIG. 1, the service execution adapter 102 coordinates the execution of the modules 106 according to the sequence described in dependency information 104. At compound service design time, the relevant module 106 properties are set and the compound service execution sequence is modeled as the dependency information 104. A generic service execution adapter 102 that is not necessarily service specific can manage the compound service execution. Upon reception of a request for a compound service, the service execution adapter 102 triggers the first module 106 through an event containing the compound service request and then waits for a response event. By analyzing the relevant dependency information 104, the service execution adapter 102 operates to determine to which module(s) 106 the response event should be passed. Furthermore, the service execution adapter 102 operates to manage parallel execution of modules that do not have dependent relationships with other modules and can thus execute concurrently. A compound service appears to a client user as any other base service, i.e., the user makes a single request and receives a single response. As such, management of the base service executions by one or more service execution modules and the related transformations is essentially transparent to the user.

As depicted in FIG. 1, one or more modules 106 directly interact with a base service 110. The base services 110 may be developed and defined by the compound service developer or by a third party. The base services 110 are generally software applications which may reside on a number of storage and/or processing platforms, for non-limiting examples, the base services 110 may be provided by an application, an application server (not shown) possibly in conjunction with a database (not shown), a computer system such as system 100 (FIG. 1), or any like hardware configured for storing and processing one or more executable sequences of instructions. Also depicted in FIG. 1 as exemplary interface components of the system 100 are a client 120, a Web server 130, and an application 140, all of which can exchange information through a network, such as the Internet (not shown) or a LAN (not shown).

Client 120 represents multiple client platforms from which a user may make a compound service request, one being a computer system such as computer system 100 (FIG.

1). In relation to the exemplary client platform such as computer system 100, a user enters the compound service request using the input device 114 (FIG. 1) and possibly the cursor control 116 (FIG. 1), and through a conventional web browser or other computer software application. The request information travels via the bus 102 (FIG. 1) to at least the communication interface 118 (FIG. 1), where it is routed through the network link 120 (FIG. 1). From the network link the request flows through the local network 122 (FIG. 1) to the host 124 (FIG. 1) or through a network such as the Internet 128 (FIG. 1) to the server 130 (FIG. 1).

Referring to the exemplary architecture of FIG. 1, the composition and aggregation system 100 application may be implemented on the host computer 124, such as an enterprise server providing the application to enterprise members. Alternatively, in this architecture the system 100 may reside on the server 130, such as a network server providing the application to users connected through the Internet 128. In either case, the computer system on which the system 100 application is stored and executes is also exemplified by the computer system 100 as illustrated in FIG. 1. In addition to the computer system 100 platform, the compound service request may also be submitted to the system 100 via other client platforms, for non-limiting examples, a hand-held electronic device such as a Person Digital Assistant (PDA), a network-enabled cellular phone, and other network-enabled devices and appliances.

The Web server 130 represents software executing on a computer system, e.g., computer system 100 (FIG. 1), for serving files such as Hypertext Transfer Protocol (HTTP) files through a network, such as local network 122 (FIG. 1) or the Internet 128 (FIG. 1). The Web server 130 represents the network component through which the compound service request is received from the client 120 and routed for processing by an application 140 prior to transmission to the composition and aggregation system 100 through a network such as the Internet 128 (FIG. 1) or a LAN 122 (FIG. 1). The Web server 130 essentially functions as a client for the system 100, and operates to transmit a request to the system 100 in an appropriate format. As previously described, an implementation of the system 100 utilizes XML documents or messages for representing the compound service request as well as for intercommunication between the service execution adapter 102, the dependency information 104, and the modules 106, and between the system 100 and the base services 110. In one embodiment, a compound service request is converted to an XML document by the application 140 prior to the Web server 130 serving it to the system 100. In another embodiment, the Web server 130 can perform the conversion of the compound service request to an XML document format. In still another embodiment, the service execution adapter 102 is configured to perform the conversion of the compound service request to an XML document format.

The application 140 can execute on the same computer system as does the Web server 130 or on a separate hardware component. As described above, the application 140 may operate to convert the compound service request to an applicable format such as XML, and it may also convert the compound service result that is received from the service execution adapter 102 into an appropriate format for delivery to the requester at client 120, possibly through the web server 130. The application 140 may provide additional functionality as well. In addition, the application 140 is intended to represent a platform, or framework, for creating and using services deployed and distributed across a network, such as through websites and Internet applications. One example of such a framework is the Oracle9i Dynamic Services, available from Oracle Corp. of Redwood Shores, Calif.

Dependency Information Example

FIG. 2 is a block diagram generally illustrating exemplary dependency information 200, specifically a directed graph, in accordance with an embodiment of the invention. As described generally above, dependency information 104 specifies a sequence in which a plurality of modules 106 (FIG. 1) must be executed to perform a compound service. FIG. 2 is used to describe an exemplary compound service, which is an international stock portfolio service that returns a stock price in a selected currency, and to define the associated module execution sequence. For instructional purposes, FIG. 2 is also referenced in describing the exemplary compound service execution flow. The compound service request includes the stock symbol and the selected currency. The compound service comprises a base service that provides the current stock price in local currency and another base service that provides currency conversion from the local currency to the selected currency.

The exemplary international stock portfolio service is represented by dependency information 200 and defines a sequence in which modules 202–208, inclusive, must be executed to perform the portfolio service. The portfolio service request is routed through a service execution adapter such as execution adapter 102 (FIG. 1), which calls the dependency information 200. The execution adapter 102 uses the dependency information 200 to manage the portfolio service execution flow.

Stepping through the sequence of dependency information 200, since the portfolio service comprises two base services, the first module executed is a message splitter module 202. Message splitter module 202 operates to receive the original service request containing both the selected stock symbol and the selected currency, and generates two different requests based on the original request, i.e., a stock price service request and a currency conversion service request. The split is executed by the splitter module 202 through application of information defined in its properties. In one embodiment, the splitter module 202 properties specify one or more XSLT stylesheets to be applied to the input message to perform the split operation. Depending on embodiments implemented, the new requests can be routed directly to the second and third modules, or they can be routed back through the execution adapter 102 (FIG. 1) for passing to the next module(s) in the sequence.

The next modules to execute are service execution module 204 and service execution module 206. Modules 204 and 206 operate to execute, in parallel, the stock price service and the currency conversion service. Modules 204 and 206 each interface directly with one of the base services, utilizing their properties, and provide the message information required to execute the associated base service. Upon reception of results from its associated base service, each module 204 and 206 generates an output message based on the results received, which are passed on to the message merger module 208. Again, the base service results may alternatively be routed back through the execution adapter 102 (FIG. 1) for result message generation and/or passing to the next modules.

The final module to execute is a message merger module 208. Merger module 208 operates to combine the result messages generated by the execution modules 204 and 206 (or execution module 102 of FIG. 1) from each of the base service results, into one final result message. The merger is executed by the merger module 208 through application of information defined in its properties. In one embodiment, the merger module 202 properties specify an XSLT stylesheet to be applied to the input messages to perform the merge operation. In one embodiment, the multiplication operation to convert the stock price result in local currency to the selected currency, is performed by the merger module 208 through application of an XSLT stylesheet. In an alternative embodiment, a custom module 106 (FIG. 1) performs the multiplication operation. In either case, in one embodiment the final result message passes through the execution adapter 102 for transmission to the application 140 (FIG. 1) and/or the Web server 130 (FIG. 1) for final conversion to a format readable by the client 120 (FIG. 1) and subsequent transmission thereto. Alternatively, in another embodiment, the execution adapter 102 performs the final conversion prior to transmission to the client 120. In another embodiment, a module 106 (FIG. 1), such as a transformer module, within the execution sequence of the compound service performs the conversion of the result message to a client-readable format. Furthermore, the system 100 can transmit the compound service result to the service request source, or to another destination different than the source.

Figure 3:
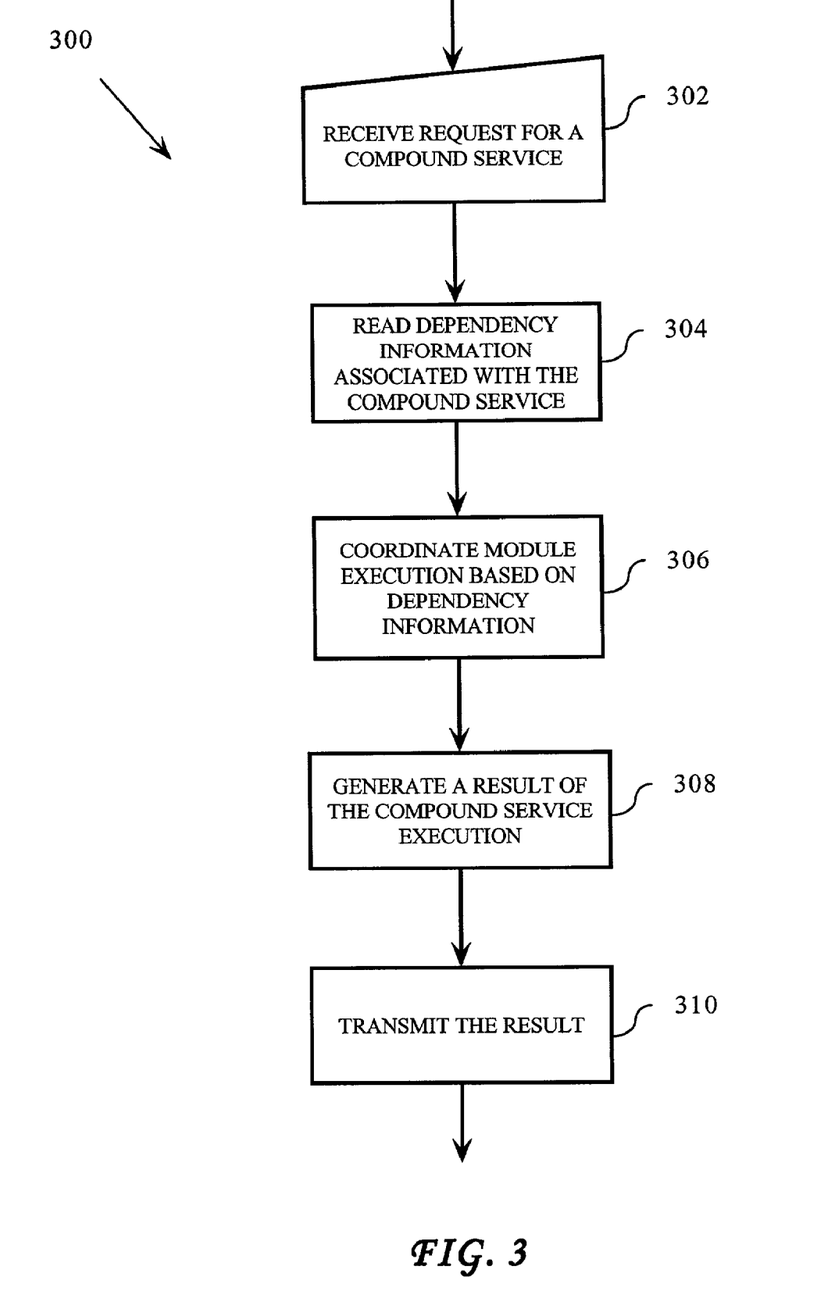
FIG. 3 is a flowchart illustrating steps for coordinating execution of a compound service, according to an aspect of the invention.

FIG. 3 is a flowchart illustrating the steps performed in a method 300 for coordinating execution of a compound service, as coordinated by the service execution adapter 102 (FIG. 1), as defined by the dependency information 104 (FIG. 1), and as executed by at least one module 106 (FIG. 1), according to an embodiment of the invention. At step 302, the service execution adapter 102 receives a request for a compound service from a client 120 (FIG. 1), which may route through a Web server 130 (FIG. 1) and an application 140 (FIG. 1) prior to reaching the service execution adapter 102. The service execution adapter 102 reads the dependency information 104 associated with the requested compound service, at step 304, and then coordinates execution of the relevant modules 106 as defined in the dependency information 104, at step 306. The system 100 (FIG. 1), at a module 106 or at the service execution adapter 102, generates a compound service result at step 308, based on the results received from the base services constituent to the requested compound service. Finally, at step 310 the execution adapter 102 transmits a representation of the compound service result out of the system 100, eventually to the client 120. As described above, the compound service result may pass through an application 140 and/or web server 130 on its path to the client 120, and may be converted to a format that is compatible with the client 120 prior to reception by the client 120.

Hardware Overview

Figure 4:
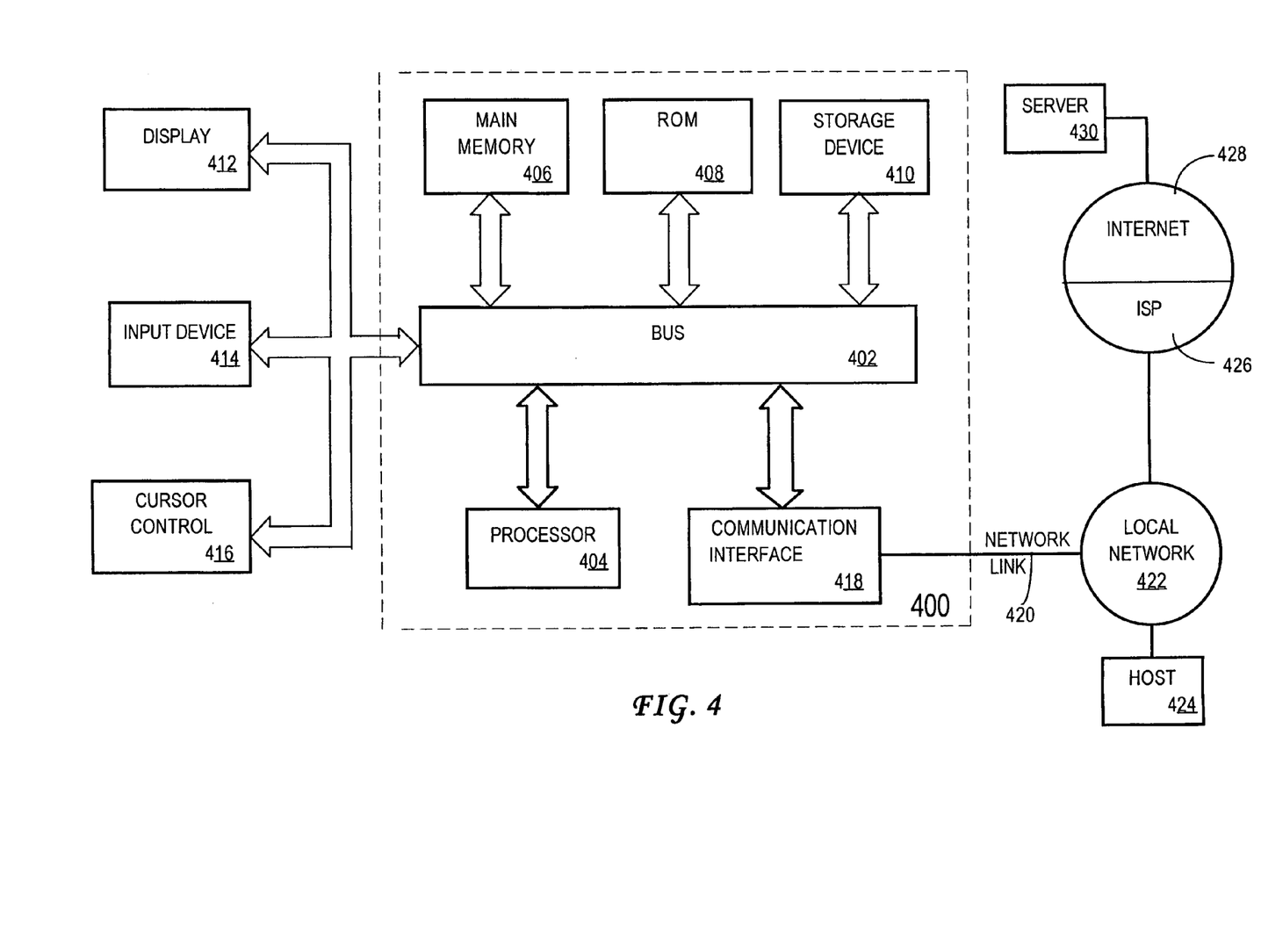
FIG. 4 is a block diagram that illustrates a computer system on which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 130 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for coordinating execution of compound Web services over a network, the method comprising the computer-implemented steps of:

receiving a request for a particular compound Web service that uses output from at least a first Web service and a second Web service;

reading dependency information specific to the particular compound Web service, wherein the dependency information specifies a sequence in which a plurality of modules must be executed to perform the particular compound Web service;

wherein at least one of the plurality of modules is from a group consisting of:

a transformation module that transforms, based on an associated module property that specifies a particular one or more XSLT stylesheets specifically for transforming data for the particular compound Web service, an input data structure into an output data structure that is different from the input data structure, a message splitter module that divides, based on an associated module property that specifies a particular one or more XSLT stylesheets specifically for splitting input messages for the particular compound Web service, an input message into a plurality of output messages, and a message merger module that merges, based on an associated module property that specifies a particular one or more XSLT stylesheets specifically for merging output messages associated with the particular compound Web service, a plurality of input messages into a single output message;

wherein properties of the plurality of modules are defined and set specifically for the particular compound Web service at service design time and persist through service runtime;

based on the dependency information, coordinating execution of the plurality of modules in the specified sequence, wherein the plurality of modules includes a first service execution module having a module property that is set specifically for coordinating execution of the first Web service and a second service execution module having a module property that is set specifically for coordinating execution of the second Web service;

controlling execution of the particular compound Web service using the properties of the plurality of modules defined and set for the particular compound Web service; and generating a result of the compound Web service based on the output from the first and second Web services.

2. The method of claim 1 wherein the dependency information specifies the sequence as a directed graph and the step of coordinating execution of the plurality of modules in the sequence includes coordinating according to information represented by the directed graph.

3. The method of claim 1 wherein the step of coordinating execution of the first service includes coordinating execution of a second compound service that uses output from at least a third service and a fourth service.

4. The method of claim 1 wherein the request for execution of the compound service is received from a source, the method further comprising the step of:

transmitting the result of the compound service to the source.

5. The method of claim 1 wherein the request for execution of the compound service is received from a source, the method further comprising the step of:

transmitting the result of the compound service to a destination different than the source.

6. The method of claim 1 wherein the dependency information specifies a sequence in which a transformation module must be executed to perform the compound service and the step of coordinating execution of the plurality of modules in the sequence includes coordinating execution of the transformation module to transform information received by the transformation module from a first data structure to a second data structure.

7. The method of claim 1 wherein the dependency information specifies a sequence in which a splitter module must be executed to perform the compound service and the step of coordinating execution of the plurality of modules in the sequence includes coordinating execution of the splitter module to divide a message received by the splitter module into a plurality of messages.

8. The method of claim 1 wherein the dependency information specifies a sequence in which a merger module must be executed to perform the compound service and the step of coordinating execution of the plurality of modules in the sequence includes coordinating execution of the merger module to merge a plurality of messages received by the merger module into a single message.

9. The method of claim 1 wherein the dependency information specifies a sequence in which a conditional module must be executed to perform the compound service and the step of coordinating execution of the plurality of modules in the sequence includes coordinating execution of the conditional module to determine which module to execute next based on a condition status.

10. The method of claim 1 wherein the dependency information specifies a sequence in which one or more of the plurality of modules must be executed concurrently to perform the compound service and the step of coordinating execution of the plurality of modules in the sequence includes coordinating concurrent execution of the one or more modules.

11. The method of claim 1, wherein the compound, first and second Web services are defined using Web Service Definition Language (WSDL).

12. The method of claim 1, wherein at least one of the first and second Web services are developed by a first party and wherein the compound Web service is developed by a second party that is different from the first party.

13. A computer-readable medium storing one or more sequences of instructions for coordinating execution of compound service over a network, wherein execution of the one or more sequences of instructions by one or more processors causes the one or more processors to perform the steps of:
  receiving a request for a particular compound Web service that uses output from at least a first Web service and a second Web service;
  reading dependency information specific to the particular compound Web service, wherein the dependency information specifies a sequence in which a plurality of modules must be executed to perform the particular compound Web service;
  wherein at least one of the plurality of modules is from a group consisting of:
    a transformation module that transforms, based on an associated module property that specifies a particular one or more XSLT stylesheets specifically for transforming data for the particular compound Web service, an input data structure into an output data structure that is different from the input data structure,
    a message splitter module that divides, based on an associated module property that specifies a particular one or more XSLT stylesheets specifically for splitting input messages for the particular compound Web service, an input message into a plurality of output messages, and
    a message merger module that merges, based on an associated module property that specifies a particular one or more XSLT stylesheets specifically for merging output messages associated with the particular compound Web service, a plurality of input messages into a single output message;
  wherein properties of the plurality of modules are defined and set specifically for the particular compound Web service at service design time and persist through service runtime;
  based on the dependency information, coordinating execution of the plurality of modules in the specified sequence, wherein the plurality of modules includes a first service execution module having a module property that is set specifically for coordinating execution of the first Web service and a second service execution module having a module property that is set specifically for coordinating execution of the second Web service;
  controlling execution of the particular compound Web service using the properties of the plurality of modules defined and set for the particular compound Web service; and
  generating a result of the compound Web service based on the output from the first and second Web services.

14. The computer-readable medium of claim 13 wherein the dependency information specifies the sequence as a directed graph and the execution of the one or more sequences of instructions by one or more processors causes the one or more processors to perform the step of coordinating execution of the plurality of modules in the sequence including coordinating according to information represented by the directed graph.

15. The computer-readable medium of claim 13 wherein the execution of the one or more sequences of instructions by one or more processors causes the one or more processors to perform the step of coordinating execution of the plurality of modules in the sequence including coordinating execution of a second compound service that uses output from at least a third service and a fourth service.

16. The computer-readable medium of claim 13 wherein the request for execution of the compound service is received from a source and the execution of the one or more sequences of instructions by one or more processors causes the one or more processors to perform the step of:
  transmitting the result of the compound service to the source.

17. The computer-readable medium of claim 13 wherein the request for execution of the compound service is received from a source and the execution of the one or more sequences of instructions by one or more processors causes the one or more processors to perform the step of:
  transmitting the result of the compound service to a destination different than the source.

18. The computer-readable medium of claim 13 wherein the dependency information specifies a sequence in which a transformation module must be executed to perform the compound service and the execution of the one or more sequences of instructions by one or more processors causes the one or more processors to perform the step of coordinating execution of the plurality of modules in the sequence including coordinating execution of the transformation module to transform information received by the transformation module from a first data structure to a second data structure.

19. The computer-readable medium of claim 13 wherein the dependency information specifies a sequence in which a splitter module must be executed to perform the compound service and the execution of the one or more sequences of instructions by one or more processors causes the one or more processors to perform the step of coordinating execution of the plurality of modules in the sequence including coordinating execution of the splitter module to divide a message received by the splitter module into a plurality of messages.

20. The computer-readable medium of claim 13 wherein the dependency information specifies a sequence in which a merger module must be executed to perform the compound service and the execution of the one or more sequences of instructions by one or more processors causes the one or more processors to perform the step of coordinating execution of the plurality of modules in the sequence including coordinating execution of the merger module to merge a plurality of messages received by the merger module into a single message.

21. The computer-readable medium of claim 13 wherein the dependency information specifies a sequence in which a conditional module must be executed to perform the compound service and the execution of the one or more sequences of instructions by one or more processors causes the one or more processors to perform the step of coordinating execution of the plurality of modules in the sequence including coordinating execution of the conditional module to determine which module to execute next based on a condition status.

22. The computer-readable medium of claim 13 wherein the dependency information specifies a sequence in which one or more of the plurality of modules must be executed concurrently to perform the compound service and the execution of the one or more sequences of instructions by one or more processors causes the one or more processors to perform the step of coordinating execution of the plurality of modules in the sequence including coordinating concurrent execution of the one or more modules.

23. A computer program product storing one or more sequences of instructions executable by a computer, the computer program product comprising:
  a plurality of invokable modules, wherein at least a subset of the plurality of invokable modules are configurable by setting one or more properties for controlling execution of corresponding particular compound Web services;
  wherein at least one of the plurality of invokable modules is from a set consisting of:
    a transformation module that transforms, based on an associated module property that specifies a particular one or more XSLT stylesheets specifically for transforming data for the particular compound Web service, an input data structure into an output data structure that is different from the input data structure,
    a message splitter module that divides, based on an associated module property that specifies a particular one or more XSLT stylesheets specifically for splitting input messages for the particular compound Web service, an input message into a plurality of output messages, and
    a message merger module that merges, based on an associated module property that specifies a particular one or more XSLT stylesheets specifically for merging output messages associated with the particular compound Web service, a plurality of input messages into a single output message;
  a compound service execution adapter configured to coordinate execution of the invokable modules according to particular dependency information corresponding to particular compound Web services, wherein the dependency information specifies a sequence in which the plurality of invokable modules, with at least one of the one or more properties set, must be executed to perform particular compound Web services by utilizing properties defined and set specifically for the particular compound Web services.

24. The system of claim 23 wherein the dependency information is a directed graph.

25. The system of claim 23 wherein the request received by the compound service execution adapter is converted to an Extensible Markup Language (XML) file by the compound service execution adapter.

26. The system of claim 23 wherein the plurality of invokable modules includes one or more message transformation modules configured to transform a first arrangement of received message information into a second arrangement of message information.

27. The system of claim 26 wherein the received message information is an Extensible Markup Language (XML) message and is transformed by applying an Extensible Stylesheet Language Transformation (XSLT) stylesheet to the XML message.

28. The system of claim 23 wherein the plurality of invokable modules includes one or more message splitter modules configured to divide an input message into a plurality of output messages.

29. The system of claim 28 wherein the input message is an Extensible Markup Language (XML) message and is divided by applying an Extensible Stylesheet Language Transformation (XSLT) stylesheet to the XML message.

30. The system of claim 23 wherein the plurality of invokable modules includes one or more message merger modules configured to merge a plurality of input messages into a single output message.

31. The system of claim 30 wherein the input messages are Extensible Markup Language (XML) messages and are merged by applying an Extensible Stylesheet Language Transformation (XSLT) stylesheet to the XML message.

32. The system of claim 23 wherein the plurality of invokable modules includes one or more service execution modules configured to interpret one or more received messages as a request for a second compound service constituent to the compound service.

33. The system of claim 23 wherein the plurality of invokable modules includes one or more conditional modules configured to direct the compound service execution adapter according to a condition status as to which invokable module to next execute.

34. The system of claim 23 wherein the dependency information specifies a sequence in which one or more of the plurality of invokable modules must be executed concurrently to perform the compound service and the compound service execution adapter coordinates concurrent execution of the one or more invokable modules according to the sequence.

35. A method for managing execution of a compound Web service that is defined using the Web Service Definition Language (WSDL), the method comprising the computer-implemented steps of:
  specifying a particular compound Web service by generating a directed graph that indicates a sequence in which a plurality of base Web services must be executed to perform the particular compound Web service, wherein each node of the graph corresponds to a module, and wherein each module includes one or more properties and communicates with one or more other modules via one or more event messages, and wherein the one or more properties are set at compound Web service design time specifically for controlling execution of the plurality of base services and persist through compound Web service runtime; and wherein at least one module is from a set consisting of:

a service execution module that, based on the module properties set specifically for the particular compound Web service, interprets one or more input messages as a request for the compound Web service and generates a result output message based on one or more responses from the plurality of base Web services, a message transformation module that transforms, based on an associated module property that specifies a particular one or more XSLT stylesheets specifically for transforming data for the particular compound Web service, an input data structure of one or more event messages into an output data structure different than the input data structure, a message splitter module that divides, based on an associated module property that specifies a particular one or more XSLT stylesheets specifically for splitting input messages for the particular compound Web service, an input message into a plurality of output messages, and a message merger module that merges, based on an associated module property that specifies a particular one or more XSLT stylesheets specifically for merging output messages associated with the particular compound Web service, a plurality of input messages into a single output message.

* * * * *